(12) United States Patent
Lai

(10) Patent No.: US 11,977,390 B2
(45) Date of Patent: May 7, 2024

(54) METHOD FOR STRAIGHT EDGE DETECTION BY ROBOT AND METHOD FOR REFERENCE WALL EDGE SELECTION BY CLEANING ROBOT

(71) Applicant: AMICRO SEMICONDUCTOR CO., LTD., Guangdong (CN)

(72) Inventor: Qinwei Lai, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 553 days.

(21) Appl. No.: 17/264,310

(22) PCT Filed: Jan. 22, 2019

(86) PCT No.: PCT/CN2018/120247
§ 371 (c)(1),
(2) Date: Jan. 29, 2021

(87) PCT Pub. No.: WO2020/042426
PCT Pub. Date: Mar. 5, 2020

(65) Prior Publication Data
US 2021/0302964 A1    Sep. 30, 2021

(30) Foreign Application Priority Data

Aug. 27, 2018  (CN) .......................... 201810979482.8

(51) Int. Cl.
*G05D 1/00*    (2006.01)
(52) U.S. Cl.
CPC .......... *G05D 1/024* (2013.01); *G05D 1/0253* (2013.01)

(58) Field of Classification Search
None
See application file for complete search history.

(56) References Cited

U.S. PATENT DOCUMENTS

| 5,576,947 A | 11/1996 | Wienkop |
| 2009/0292394 A1 | 11/2009 | Hyung et al. |

(Continued)

FOREIGN PATENT DOCUMENTS

| CN | 102798359 A | 11/2012 |
| CN | 203687993 U | 7/2014 |

(Continued)

OTHER PUBLICATIONS

Wu-Zu, Y., et al. "A simultaneous localization and mapping method based on fast-hough transform." Inform. Technol. I 7 (2008): 190-194. (Year: 2008).*

(Continued)

*Primary Examiner* — Peter D Nolan
*Assistant Examiner* — Jacob Kent Besteman-Street
(74) *Attorney, Agent, or Firm* — Samson G. Yu

(57) ABSTRACT

The present disclosure relates to a method for straight edge detection by a robot and a method for reference wall edge selection by a cleaning robot. The method for straight edge detection by the robot includes that: position coordinates of detection points are determined according to distance values detected by a distance sensor of the robot and angle values detected by an angle sensor of the robot, and then a final straight edge is determined according to a slope of a straight line formed by adjacent two of the detection points.

10 Claims, 2 Drawing Sheets

(56) References Cited

U.S. PATENT DOCUMENTS

| | | | | |
|---|---|---|---|---|
| 2014/0336863 | A1* | 11/2014 | So | A47L 9/2815 |
| | | | | 701/28 |
| 2016/0132056 | A1* | 5/2016 | Yoshino | G05D 1/0274 |
| | | | | 701/23 |
| 2016/0320777 | A1* | 11/2016 | Yun | G05D 1/0238 |
| 2018/0120852 | A1* | 5/2018 | Cho | G05D 1/0274 |

FOREIGN PATENT DOCUMENTS

| | | |
|---|---|---|
| CN | 106123780 A | 11/2016 |
| CN | 106843239 A | 6/2017 |
| CN | 106959695 A | 7/2017 |
| CN | 107315426 A | 11/2017 |
| CN | 107443385 A | 12/2017 |
| CN | 107704801 A | 2/2018 |
| CN | 207216430 U | 4/2018 |
| CN | 108415432 A | 8/2018 |
| CN | 109085834 A | 12/2018 |
| DE | 3536747 A1 | 4/1989 |
| JP | 2012088135 A | 5/2012 |
| JP | 2017036981 A | 2/2017 |

OTHER PUBLICATIONS

Yin, Mingxue. "Mathematics". Inclined angle and slope of straight line. Oct. 31, 2013( Oct. 31, 2013). p. 56. Published in China.
The extended European search report of the corresponding EP patent application No. 18931950.2, dated Jul. 14, 2022.
Wu Zu Yu et al: "A Simultaneous Localization and Mapping Method Based on Fast-Hough Transform", Jan. 1, 2008(Jan. 1, 2008), pp. 190-194, XP055930831, DOI: 10.3923/itj.2008.190.194.
Viet Nguyen et al: "A comparison of line extraction algorithms using 2D range data for indoor mobile robotics", Autonomous Robots, Kluwer Academic Publishers, BO, vol. 23, No. 2, Jun. 8, 2007 (Jun. 8, 2007), pp. 97-111, XP019523700, ISSN: 1573-7527, DOI: 10.1007/S10514-007-9034-Y * Chapter 3 Selected algorithms and related work; p. 99-p. 101.

* cited by examiner

METHOD FOR STRAIGHT EDGE DETECTION BY ROBOT AND METHOD FOR REFERENCE WALL EDGE SELECTION BY CLEANING ROBOT

TECHNICAL FIELD

The present disclosure relates to the technical field of intelligent robots, and in particular to a method for straight edge detection by a robot and a method for reference wall edge selection by a cleaning robot.

BACKGROUND

Measuring a running trend of a wall surface plays an important role for many robots. For example, a cleaning robot, after measuring the running trend of the wall surface, the cleaning robot can travel parallel to the wall surface or perpendicular to the wall surface, so that a traveling direction is consistent with a shape of the ground, thus having a high efficiency. An automatic cruise robot may plan a path of this automatic cruise robot by measuring wall surface obstacle information; and a robot having a cleaning planning function may measure the running trend of the wall surface for assisting a positioning of the robot. At present, measuring a wall surface is usually implemented by a robot traveling along an edge, and may also be implemented by a rotating laser. The former has a greater error and longer time consumption, but the latter has higher costs. A laser head is generally on an upper surface of a machine and many obstacles cannot be detected, and therefore the assistance from the machine's own behavior of traveling along edges is still needed.

SUMMARY

At least some embodiments of the present disclosure provide a method for straight edge detection by a robot and a method for reference wall edge selection by a cleaning robot, which can accurately detect a straight edge around the robot, thereby providing an effective reference for subsequent operations performed by the robot using the straight edge. The specific technical solution of the present disclosure is as follows:

A method for straight edge detection by a robot, including the following steps: a robot rotating in place, and determining position coordinates of detection points according to distance values detected by a distance sensor of the robot and angle values detected by an angle sensor of the robot; and determining, according to the position coordinates of the detection points, whether a slope of a straight line formed by adjacent two of the detection points is within a preset error range, when the slope of the straight line formed by adjacent two of the detection points is within the preset error range, determining that edges corresponding to detection points on the straight line of which the slope is within the preset error range are straight edges, and when the slope of the straight line formed by adjacent two of the detection points is not within the preset error range, determining that edges corresponding to detection points on the straight line of which the slope is not within the preset error range are not straight edges.

In an optional embodiment, an operation of determining the position coordinates of each of detection points according to the distance values detected by the distance sensor and the angle values detected by the angle sensor includes the following steps: determining the angle values detected by the angle sensor of the robot as $A_i$; determining, when the robot is at angle $A_i$, distance values detected by the distance sensor of the robot as $L_i$; and determining the position coordinates of the detection points as ($X_i = L_i * \cos A_i$, $Y_i = L_i * \sin A_i$). i represents a natural number and i is greater than or equal to 1.

In an optional embodiment, an operation of determining, according to the position coordinates of the detection points, whether a slope of the straight line formed by adjacent two of the detection points is within the preset error range specifically includes the following steps: determining the coordinates of adjacent two of the detection points as ($X_i$, $Y_i$) and ($X(i-1)$, $Y(i-1)$), and the slope of the two detection points as $K_i = (Y_i - Y(i-1))/(X_i - X(i-1))$; and determining whether a difference between the arc tangent value of $K_i$ and the arc tangent value of $K(i-1)$ is less than or equal to a preset error value, when the difference between the arc tangent value of $K_i$ and the arc tangent value of $K(i-1)$ is less than or equal to the preset error value, determining that the slope of the straight line formed by adjacent two of the detection points is within the preset error range, and when the difference between the arc tangent value of $K_i$ and the arc tangent value of $K(i-1)$ is not less than or equal to the preset error value, determining that the slope of the straight line formed by adjacent two of the detection points is not within the preset error range.

In an optional embodiment, the preset error value is 1°.

In an optional embodiment, when rotating in place, the robot stops for a preset time period after each rotation of a preset angle value, and performs multiple times for detecting distance values within the preset time period by the distance sensor, and then an average value of the distance values is taken as a distance value from the robot to a detection point corresponding to the robot.

In an optional embodiment, the preset angle value is less than or equal to 30°.

In an optional embodiment, after an operation of determining that the edges corresponding to the detection points on the straight line of which the slope is within the preset error range are the straight edges, the method further includes the following step: calculating, by using the least squares method, the detection points on the straight line of which the slope is within the preset error range to fit an optimal straight line, and determining an edge corresponding to the optimal straight line as a detected straight edge.

In an optional embodiment, before the robot rotates in place, the method further includes the following step: the robot traveling in a direction away from an obstacle by a preset distance, stopping traveling, and then rotating in place.

In an optional embodiment, after an operation of determining that the edges corresponding to the detection points on the straight line of which the slope is within the preset error range are the straight edges, the method further includes the following step: selecting a straight edge having the longest length from the straight edges as a reference edge.

In an optional embodiment, after an operation of determining that the edges corresponding to the detection points on the straight line of which the slope is within the preset error range are the straight edges, the method further includes the following steps: analyzing images captured by a vision sensor of the robot during rotation, and parsing the images to obtain the straight edges in the images; and taking a straight edge corresponding to the detection points on the straight line of which the slope is within the preset error range and corresponding to the longest straight edge in an image as the reference edge.

A method for reference wall edge selection by a cleaning robot, including the following steps: step one: the cleaning robot rotating in place, and determining the position coordinates of detection points according to distance values detected by a distance sensor of the cleaning robot and angle values detected by an angle sensor of the cleaning robot, and then proceeding to step two; step two: determining, according to the position coordinates of the detection points, whether a slope of a straight line formed by adjacent two of the detection points is within a preset error range, when the slope of the straight line formed by adjacent two of the detection points is within the preset error range, determining that edges corresponding to the detection points on the straight line of which the slope is within the preset error range are straight edges, and proceeding to step three, and when the slope of the straight line formed by adjacent two of the detection points is not within the preset error range, determining that edges corresponding to the detection points on the straight line of which the slope is not within the preset error range are not straight edges; step three: analyzing images captured by a vision sensor of the cleaning robot during rotation, and parsing the images to obtain straight edges in the images, and then proceeding to step four; step four: taking a straight edge corresponding to the detection points on the straight line of which the slope is within the preset error range and corresponding to the longest straight edge in the images as a reference wall edge.

According to the method for straight edge detection by a robot, the position coordinates of detection points are determined according to distance values detected by the distance sensor of the robot and angle values detected by an angle sensor of the robot, and then a final straight edge is determined according to a slope of a straight line formed by adjacent two of the detection points, thereby having high detection precision and accuracy, without requiring the robot to determine a straight edge by means of a behavior of traveling along an edge, and greatly improving the working efficiency. In addition, in the method for reference wall edge selection by the cleaning robot, the same means is adopted to determine a straight edge, and then the straight edge is compared with straight edges in images captured by a visual sensor of the cleaning robot to select the longest straight edge as a reference wall edge, thereby providing an accurate and effective reference for subsequent operations performed by the robot such as positioning along the reference wall edge.

DETAILED DESCRIPTION

The technical solutions according to the embodiments of the present disclosure will be described below in detail with reference to the drawings in the embodiments of the present disclosure. It should be understood that the embodiments described below are intended to explain the present disclosure, but not to limit the present disclosure. In the following description, specific details are given to provide a thorough understanding of the embodiments. However, it will be appreciated by those skilled in the art that the embodiments may be practiced without these specific details. For example, circuits may be shown in block diagrams to avoid blurring the embodiments in unnecessary details. In other instances, well-known circuits, structures, and techniques may not be shown in detail in order not to obscure the embodiments.

Figure 1:
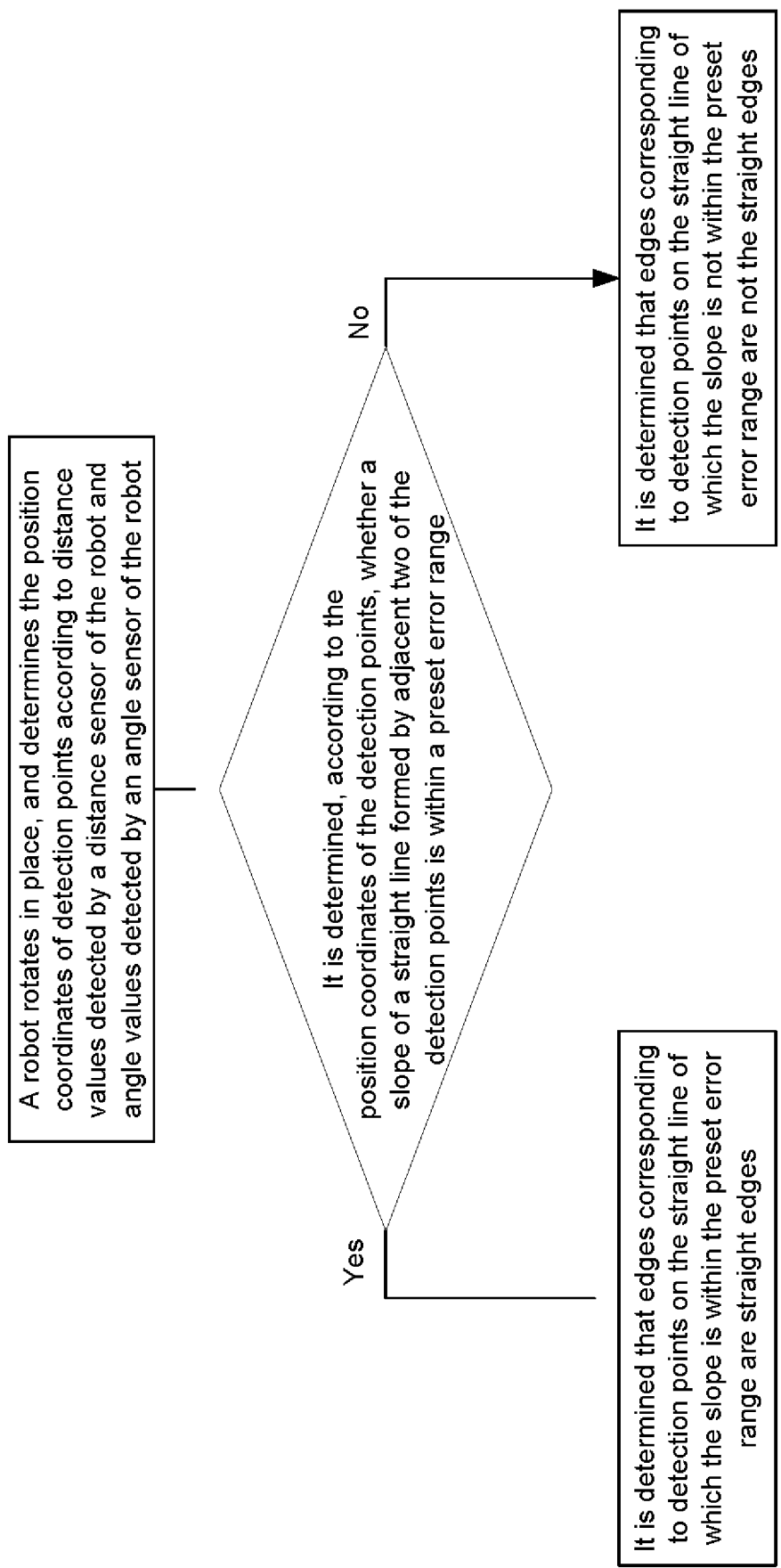
FIG. 1 is a schematic flowchart illustrating a method for straight edge detection by a robot according to an embodiment of the present disclosure.

FIG. 1 shows a method for straight edge detection by a robot according to an embodiment of the present disclosure. The robot may be a mobile robot used in industry, may also be a household service robot, and may also be other intelligent mobile machine equipment. The method includes the following steps: firstly, a robot rotates in place, and determines the position coordinates of detection points according to distance values detected by a distance sensor of the robot and angle values detected by an angle sensor of the robot. The distance sensor is provided at a front end or a top end of a robot body, one distance sensor may be provided, and multiple distance sensors may also be provided at the same time. The distance sensor may be a Time of Flight (TOF) sensor or a laser sensor using triangulation, and a distance to be detected by the distance sensor is at least greater than 1 meter, which may be specifically selected according to design requirements of a product. The angle sensor is a gyroscope or other sensor capable of detecting an angle, and the gyroscope can detect an angle change of the robot in real time along with rotation of the robot. The robot may perform detection while rotating, and may also rotate by a certain angle, and stop to complete relevant detection, and then continue to rotate by a certain angle and perform detection, and so on. The robot rotates by one turn to complete one detection. Definitely, in order to improve detection precision, the robot may also rotate by several turns and then an average value of multiple detections corresponding to the several turns is taken as a detection result. The detection point is a reflection point formed on an obstacle after a distance measurement signal sent by the distance sensor is reflected by the obstacle. The position coordinates of the detection point are coordinate values of positions where the corresponding reflection points are located on the obstacle, and the coordinate values may be calculated according to a relationship of trigonometric function. The coordinates are coordinates on a map constructed by the robot. After determining the position coordinates of the detection points, the robot determines, according to the position coordinates of the detection points, whether a slope of a straight line formed by adjacent two of the detection points is within a preset error range. The slope may be calculated by using a slope formula of a straight line, i.e., dividing a difference between Y coordinates by a difference between X coordinates of the two points on the straight line. The preset error range may be correspondingly set according to specific design requirements of a product. The smaller the set range value is, the higher the detection precision is, and a range may generally be represented by an angle. For example, when a difference between two angles corresponding to the slopes is less than 0.5° or 1°, it may be considered that a certain slope is within the preset error range. When the slope of the straight line formed by adjacent two of the detection points is within the preset error range, it indicates that the line obtained by connecting the straight lines formed by these detection points is relatively flat and straight, and does not curve to a large extent. These detection points may be points on the same straight line, and therefore, it may be determined that edges corresponding to the detection points on the straight line of which the slope is within the preset error range are straight edges. When the slope of the straight line formed by adjacent two of the detection points is not within the preset error range, it indicates that the straight line formed by these two detection points significantly deviates from the straight line formed by the other detection points, and has an obvious curve. In this case, the two detection points are not on the same straight line as the other detection points on the straight line of which the slope is within the preset error range, and it may be determined that edges corresponding to the detection points on the straight line of which the slope is not within the preset error range are not straight edges. A straight edge refers to a straight line formed by connecting, in series, points detected by the distance sensor of the robot on a surface of an object having a flat and straight surface, such as a single-sided wall, a side wall of a sofa base, and a side wall of a cabinet base. When a straight edge is detected by the robot, an object corresponding to the straight edge may be used as a reference for positioning, and a constructed map may also be corrected, so as to improve the accuracy of the map. According to the method for straight edge detection by a robot, the position coordinates of detection points are determined according to distance values detected by the distance sensor and angle values detected by the angle sensor, and then a final straight edge is determined according to the slope of the straight line formed by adjacent two of the detection points, thereby having high detection precision and accuracy, without requiring the robot to determine a straight edge by means of a behavior of traveling along an edge, and greatly improving the working efficiency.

Figure 2:
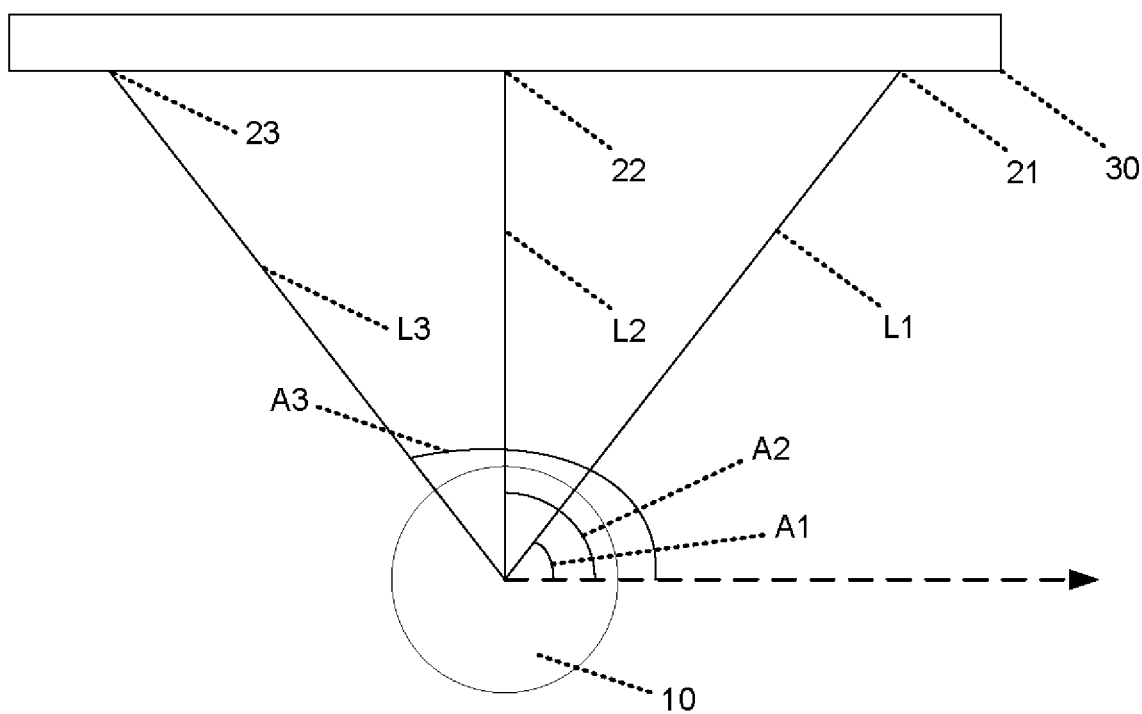
FIG. 2 is a schematic diagram of analysis and explanation for straight edge detection by a robot according to an embodiment of the present disclosure.

In an optional embodiment, an operation of determining the position coordinates of each of detection points according to the distance values detected by the distance sensor and the angle values detected by the angle sensor includes the following steps. The angle values detected by the angle sensor of the robot are determined as $A_i$. When the robot is at angle $A_i$, the distance values detected by the distance sensor of the robot are determined as $L_i$. The position coordinates of the detection points are determined as $(X_i = L_i * \cos A_i, Y_i = L_i * \sin A_i)$. And i represents a natural number and i is greater than or equal to 1. As shown in FIG. 2, a robot 10 starts rotating in a counterclockwise direction from a direction of a horizontal dotted line. When rotating to angle A1, a distance detected by a distance sensor from the robot 10 to a first detection point 21 on a wall edge 30 is L1. The robot continues rotating, and when rotating to angle A2, a distance detected by the distance sensor from the robot 10 to a second detection point 22 on the wall edge 30 is L2. Likewise, when rotating to angle A3, a distance detected by the distance sensor from the robot 10 to a third detection point 23 on the wall edge 30 is L3, and so on until the robot rotates by one turn. Assuming that current coordinates of the robot are (0, 0), A1=45°, and L1=200, position coordinates of the first detection point 21 are (100*cos 45°, 100*sin 45°)=(70.7, 70.7), and similarly, the coordinates of the other detection points can be calculated in this way. According to the method, the coordinates of detection points are calculated according to a relationship of plane trigonometric function, the computation processing speed is fast, and few computation resources are required, thus improving the data processing rate of the robot.

In an optional embodiment, an operation of determining, according to the position coordinates of the detection points, whether the slope of the straight line formed by adjacent two of the detection points is within the preset error range includes the following steps. The coordinates of adjacent two of the detection points are determined as $(X_i, Y_i)$ and $(X(i-1), Y(i-1))$, and the slope of the two detection points is determined as $K_i=(Y_i-Y(i-1))/(X_i-X(i-1))$. Whether a difference between the arc tangent value of $K_i$ and the arc tangent value of $K(i-1)$ is less than or equal to a preset error value is determined. When the difference between the arc tangent value of $K_i$ and the arc tangent value of $K(i-1)$ is less than or equal to the preset error value, it is determined that the slope of the straight line formed by adjacent two of the detection points is within the preset error range, and when the difference between the arc tangent value of $K_i$ and the arc tangent value of $K(i-1)$ is not less than or equal to the preset error value, it is determined that the slope of the straight line formed by adjacent two of the detection points is not within the preset error range. The preset error value may be correspondingly set according to specific design requirements of a product, and may be set to any value from 0° to 2°. As shown in FIG. 2, assuming that the position coordinates of the first detection point 21 is (70.7, 70.7) by means of calculation according to the described method, the position coordinates of the second detection point 22 may be (0, 70.2) and the position coordinates of the third detection point 23 may be (−70.5, 70.8) due to detection errors. And then a slope of a straight line formed by the first detection point 21 and the second detection point 22 satisfies K1=0.0070721357, and the arc tangent value satisfies arctan(0.0070721367)≈0.405°. A slope of a straight line formed by the second detection point 22 and the third detection point 23 satisfies K2=−0.0028288543, the arc tangent value satisfies arctan(−0.0028288543)=−0.162°, and the difference between the two angles is 0.567°. When the preset error value is set to 2°, as 0.567°<2°, it indicates that the straight line where the three detection points are located is the same straight line, i.e., the robot detects a straight edge. Assuming that the coordinates of a fourth detection point are (−100, 0), a slope between the fourth detection point and the third detection point 23 satisfies K3=2.4, the arc tangent value satisfies arctan(2.4) 67.38°, and the difference between the two angles is 67.38°−(−0.162°)=67.542°, which is much greater than the preset error value. And therefore it is considered that a straight line formed by the third detection point and the fourth detection point is not located on the same straight line as the straight line formed by the second detection point and the third detection point, and is not a straight edge detected by the robot. According to the method, whether a connecting line formed by the detection points is a straight line is determined by means of calculating a slope, the calculation is simple and convenient, and the computation speed is fast, thus enabling a relatively high data processing speed of the robot.

Specifically, the preset error value may be set to 1°, when the set value is too large, the accuracy of straight edge detection will be reduced, and when the set value is too small, an originally straight edge will be mistaken frequently to be not a straight edge, resulting in an error in the detection result. Setting the preset error value to 1° may achieve the best detection effect.

As one implementation, when rotating in place, the robot stops for a preset time period after each rotation of a preset angle value, and performs multiple times for detecting distance values within the preset time period by the distance sensor, and then an average value of the distance values is taken as a distance value from the robot to a detection point corresponding to the robot. The preset angle value and the preset time period may be correspondingly set according to specific design requirements of a product. The preset angle value may be set to a value less than or equal to 45°, and the preset time period may be set to any value from 0.3 seconds to 1 second. The robot may take an average value as a final detection result by performing multiple times of data acquisition for the detection points, thereby improving the detection accuracy of the robot, and providing an accurate and effective reference basis for subsequent analysis of whether a straight edge is detected by the robot.

In an optional embodiment, the preset angle value is less than or equal to 30°. When the preset angle value is set to 10°, the robot can acquire data of 36 detection points after rotating by one turn.

As one implementation, after an operation of determining that edges corresponding to the detection points on the straight line of which the slope is within the preset error range are the straight edges, the method further includes the following step. The detection points on the straight line of which the slope is within the preset error range are calculated by using the least squares method to fit an optimal straight line, and an edge corresponding to the optimal straight line is determined as a detected straight edge. In cases where a preliminary detection result shows there are many detection points on the same straight line, these detection points have certain discreteness. However, in practice, one straight edge exists. Therefore, the robot performs a least squares operation on these discrete detection points, so that an optimal straight line may be fitted. This optimal straight line best fits the actual straight edge, thereby further improving the accuracy of straight edge detection by the robot.

As one implementation, before the robot rotates in place, the method further includes the following step. The robot travels in a direction away from an obstacle by a preset distance, stopping traveling, and then rotating in place. The preset distance may be correspondingly set according to specific design requirements, and preferably, may be set to 1 meter or 2 meters. The robot may determine which direction is the direction away from the obstacle by analyzing map data. When the robot is close to a straight-edged obstacle such as a wall, and the robot rotates and performs detection, among the detection points which are acquired on the straight-edged obstacle such as a wall, data of the detection points far away from the robot may be obtained, and data of the detection points close to the robot may also be obtained. Errors may easily occur from these data. Therefore, the robot traveling in a direction away from an obstacle by a preset distance and then performing data detection may improve the detection accuracy.

As one implementation, after an operation of determining that the edges corresponding to the detection points on the straight line of which the slope is within the preset error range are the straight edges, further includes the following step. The straight edge having the longest length from the determined straight edges is selected as a reference edge. Since during rotation of the robot by one turn, multiple straight-edged obstacles may be detected at the same time, in this case in order for efficient utilization of the straight edge subsequently by the robot, a straight edge having the longest length needs to be selected and determined as a reference edge, and in this way, the reference value and accuracy of the determined reference edge are improved.

As one implementation, after an operation of determining that the edges corresponding to the detection points on the straight line of which the slope is within the preset error range are the straight edges, further includes the following steps. Images captured by a vision sensor of the robot during rotation are analyzed, and the images are parsed to obtain the straight edges in the images. And a straight edge corresponding to the detection points on the straight line of which the slope is within the preset error range and corresponding to the longest straight edge in an image is taken as the reference edge. A method for parsing the images to obtain straight edges, which may be based on the principle of straight line detection by Hough transform, includes the following steps. At step one, a color image is converted into a gray scale image. At step two, a de-noising (Gaussian kernel) processing is performed on the gray scale image to obtain a first processed result. At step three, an edge extraction (gradient operator, Laplace operator, canny, sobel) processing is performed on the first processed result to obtain a second processed result. At step four, a binarization processing is performed on the second processed result to determine whether it is at least one edge point depends on whether satisfying the gray scale value==255) to obtain a third processed result. At step five, a processing of mapping to a Hough space (preparing two containers, one being used to display a hough-space profile, and another being an array of hough-space for storing voting values, because there is usually a certain maximum value exceeding a threshold in a voting process, which is up to thousands, and a gray scale image cannot be directly used for recording voting information) is performed on the third processed result to obtain a fourth processed result. At step six, a processing of taking a local maximum value, setting a threshold, and filtering interference straight lines are performed on the fourth processed result to obtain a fifth processed result. At step seven, a processing of drawing the straight lines and calibrating corner points are performed on the fifth processed result. By combining image analysis, the reference edge determined by the robot has high accuracy and reference value.

A method for reference wall edge selection by a cleaning robot is further provided. The cleaning robot may be a sweeping robot or a mopping robot. In a cleaning process, the cleaning robot easily has a deviation in traveling due to factors such as an internal device or an external environment, and in this case, the cleaning robot needs to perform error correction, and one effective correction method is to perform correction by traveling along a flat and straight wall edge. Therefore, the cleaning robot selecting an accurate and reliable reference wall edge before performing correction is a basis for effective correction. The method for reference wall edge selection according to this embodiment includes the following steps.

At step one, the cleaning robot rotates in place, and determines the position coordinates of detection points according to distance values detected by a distance sensor of the cleaning robot and angle values detected by an angle sensor of the cleaning robot, and then proceeds to step two.

At step two, it is determined that, according to the position coordinates of the detection points, whether a slope of a straight line formed by adjacent two of the detection points is within a preset error range. When the slope of the straight line formed by adjacent two of the detection points is within the preset error range, it is determined that edges corresponding to the detection points on the straight line of which the slope is within the preset error range are straight edges, and proceeding to step three. And when the slope of the straight line formed by adjacent two of the detection points is not within the preset error range, it is determined that edges corresponding to the detection points on the straight line of which the slope is not within the preset error range are not straight edges.

At step three, images captured by a vision sensor of the cleaning robot during rotation are analyzed, and the images are parsed to obtain straight edges in the images, and then proceeding to step four.

At step four, a straight edge corresponding to the detection points on the straight line of which the slope is within the preset error range and corresponding to the longest straight edge in the images is taken as a reference wall edge.

The embodiment of the method for reference wall edge selection is similar to the foregoing embodiment of the straight edge detection, and is not described herein again. The cleaning robot makes a selection from the detected straight edges as a wall edge, and the selected straight edge is a reference wall edge.

Those skilled in the art can understand that all or some of steps for implementing the above method embodiments may be completed by a program instructing related hardware. These programs may be stored in a computer readable storage medium (various mediums that can store program codes, such as a Read Only Memory (ROM), a Random Access Memory (RAM), a magnetic disk, or an optical disk). The program performs the steps including the above method embodiments when being executed. Finally, it is should be noted that all the above embodiments are used for illustrating the technical solutions of the present disclosure, but not used as a limitation thereto. Although the present disclosure has been explained in details with reference to the above embodiments, those skilled in the art should understand that they can still make modifications to the technical solutions described in the above embodiments, or can still make equivalent replacements for some of or all technical features therein. These modifications or replacements shall not render the essence of the corresponding technical solutions to depart from the scope of the technical solutions according to the embodiments of the present disclosure.

What is claimed is:

1. A method for straight edge detection by a robot, comprising the following steps:
    a robot rotating in place, and determining position coordinates of detection points according to distance values detected by a distance sensor of the robot and angle values detected by an angle sensor of the robot; and
    determining, according to the position coordinates of the detection points, whether a slope of a straight line formed by adjacent two of the detection points is within a preset error range, when the slope of the straight line formed by adjacent two of the detection points is within the preset error range, determining that edges corresponding to detection points on the straight line of which the slope is within the preset error range are straight edges, and when the slope of the straight line formed by adjacent two of the detection points is not within the preset error range, determining that edges corresponding to detection points on the straight line of which the slope is not within the preset error range are not the straight edges,
    after determining that the edges corresponding to the detection points on the straight line of which the slope is within the preset error range are the straight edges, the method further comprising the following steps:
    analyzing images captured by a vision sensor of the robot during rotation, and parsing the images to obtain the straight edges in the images; and
    taking a straight edge corresponding to the detection points on the straight line of which the slope is within the preset error range and corresponding to the longest straight edge in a image as a reference edge.

2. The method as claimed in claim 1, wherein determining the position coordinates of detection points according to the distance values detected by the distance sensor and the angle values detected by the angle sensor comprises the following steps:
    determining the angle values detected by the angle sensor of the robot as $A_i$;
    determining, when the robot is at angle $A_i$, distance values detected by the distance sensor of the robot as $L_i$; and
    determining the position coordinates of the detection points as $(X_i = L_i * \cos A_i, Y_i = L_i * \sin A_i)$;
    wherein i represents a natural number and i is greater than or equal to 1.

3. The method as claimed in claim 1, wherein determining, according to the position coordinates of the detection points, whether the slope of the straight line formed by adjacent two of the detection points is within the preset error range comprises the following steps:
    determining the coordinates of adjacent two of the detection points as $(X_i, Y_i)$ and $(X(i-1), Y(i-1))$, and the slope of the two detection points as $K_i = (Y_i - Y(i-1))/(X_i - X(i-1))$; and
    determining whether a difference between the arc tangent value of $K_i$ and the arc tangent value of $K(i-1)$ is less than or equal to a preset error value, when the difference between the arc tangent value of $K_i$ and the arc tangent value of $K(i-1)$ is less than or equal to the preset error value, determining that the slope of the straight line formed by adjacent two of the detection points is within the preset error range, and when the difference between the arc tangent value of $K_i$ and the arc tangent value of $K(i-1)$ is not less than or equal to the preset error value, determining that the slope of the straight line formed by adjacent two of the detection points is not within the preset error range.

4. The method as claimed in claim 3, wherein the preset error value is 10.

5. The method as claimed in claim 1, when the robot rotates in place, stopping for a preset time period after each rotation of a preset angle value, performing a plurality of times for detecting distance values within the preset time period by the distance sensor, and then taking an average value of the distance values as a distance value from the robot to a detection point corresponding to the robot.

6. The method as claimed in claim 5, wherein the preset angle value is less than or equal to 30°.

7. The method as claimed in claim 1, after determining that the edges corresponding to the detection points on the straight line of which the slope is within the preset error range are the straight edges, further comprising the following step:
    calculating, by using the least squares method, the detection points on the straight line of which the slope is within the preset error range to fit an optimal straight line, and determining an edge corresponding to the optimal straight line as a detected straight edge.

8. The method as claimed in claim 1, before the robot rotates in place, further comprising the following step:
    the robot traveling in a direction away from an obstacle by a preset distance, stopping traveling, and then rotating in place.

9. The method as claimed in claim 1, after determining that the edges corresponding to the detection points on the straight line of which the slope is within the preset error range are the straight edges, further comprising the following step:
    selecting a straight edge having the longest length from the straight edges as a reference edge.

10. A method for reference wall edge selection by a cleaning robot, comprising the following steps:
- step one: the cleaning robot rotating in place, and determining the position coordinates of detection points according to distance values detected by a distance sensor of the cleaning robot and angle values detected by an angle sensor of the cleaning robot, and then proceeding to step two;
- step two: determining, according to the position coordinates of the detection points, whether a slope of a straight line formed by adjacent two of the detection points is within a preset error range, when the slope of the straight line formed by adjacent two of the detection points is within the preset error range, determining that edges corresponding to the detection points on the straight line of which the slope is within the preset error range are straight edges, and proceeding to step three, and when the slope of the straight line formed by adjacent two of the detection points is not within the preset error range, determining that edges corresponding to the detection points on the straight line of which the slope is not within the preset error range are not straight edges;
- step three: analyzing images captured by a vision sensor of the cleaning robot during rotation, and parsing the images to obtain straight edges in the images, and then proceeding to step four;
- step four: taking a straight edge corresponding to the detection points on the straight line of which the slope is within the preset error range and corresponding to the longest straight edge in the images as a reference wall edges,
- after determining that the edges corresponding to the detection points on the straight line of which the slope is within the preset error range are the straight edges, the method further comprising the following steps:
- analyzing images captured by a vision sensor of the robot during rotation, and parsing the images to obtain the straight edges in the images; and
- taking a straight edge corresponding to the detection points on the straight line of which the slope is within the preset error range and corresponding to the longest straight edge in a image as a reference edge.

* * * * *